United States Patent
Kreiner (10) Patent No.: US 11,473,635 B2
(45) Date of Patent: Oct. 18, 2022

(54) MULTI-PART BRAKE DRUM

(71) Applicant: SAF-HOLLAND GmbH, Bessenbach (DE)

(72) Inventor: Kerstin Kreiner, Aschaffenburg (DE)

(73) Assignee: SAF-HOLLAND GmbH, Bessenbach (DE)

( * ) Notice: Subject to any disclaimer, the term of this patent is extended or adjusted under 35 U.S.C. 154(b) by 0 days.

(21) Appl. No.: 16/981,159

(22) PCT Filed: Mar. 19, 2019

(86) PCT No.: PCT/EP2019/056788
§ 371 (c)(1),
(2) Date: Sep. 15, 2020

(87) PCT Pub. No.: WO2019/179989
PCT Pub. Date: Sep. 26, 2019

(65) Prior Publication Data
US 2021/0115989 A1      Apr. 22, 2021

(30) Foreign Application Priority Data

Mar. 19, 2018   (DE) .................... 10 2018 106 297.4

(51) Int. Cl.
*F16D 65/10*   (2006.01)
*F16D 65/02*   (2006.01)

(52) U.S. Cl.
CPC ...... *F16D 65/10* (2013.01); *F16D 2065/1304* (2013.01); *F16D 2065/1356* (2013.01); *F16D 2065/1384* (2013.01)

(58) Field of Classification Search
CPC ............. F16D 65/10; F16D 2065/1304; F16D 2065/1356; F16D 2065/1384
See application file for complete search history.

(56) References Cited

U.S. PATENT DOCUMENTS 2,026,263 A * 12/1935 White ..................... F16D 65/10
                                                                 188/218 R
2,080,295 A    5/1937 Begg et al.
(Continued)

FOREIGN PATENT DOCUMENTS

DE         1795510          9/1959
DE       102009032008      1/2011
(Continued)

OTHER PUBLICATIONS

European Patent Office; International Search Report; dated Jun. 12, 2019.

*Primary Examiner* — Robert A. Siconolfi
*Assistant Examiner* — James K Hsiao
(74) *Attorney, Agent, or Firm* — Price Heneveld LLP (57) ABSTRACT

A brake drum for utility vehicles configured to mount rotatably about an axis of rotation and including a friction section and a connection section, wherein the friction section includes a friction surface and a plurality of transmission structures, wherein the connection section comprises at least one mounting surface and a plurality of transfer structures, wherein the transfer structures engage positively and/or nonpositively in the respective complementary transmission structures so that a torque about the axis of rotation can be transmitted positively, and wherein the mounting surface serves to fix the brake drum indirectly or directly to a hub.

20 Claims, 4 Drawing Sheets

(56) References Cited

U.S. PATENT DOCUMENTS

| | | | | |
|---|---|---|---|---|
| 2,398,501 | A * | 4/1946 | Le Jeune | F16D 65/10 188/218 R |
| 2,558,297 | A * | 6/1951 | Horn | F16D 65/10 188/218 R |
| 2,588,297 | A | 3/1952 | Scheppe | |
| 2,588,665 | A * | 3/1952 | Sinclair | F16D 65/10 188/218 A |
| 2,639,195 | A * | 5/1953 | Bock | F16D 65/0006 301/6.91 |
| 2,679,304 | A * | 5/1954 | Horn | F16D 65/10 188/218 R |
| 4,281,745 | A * | 8/1981 | Wirth | F16D 65/124 188/218 XL |
| 4,989,697 | A * | 2/1991 | Denton | F16D 65/827 188/264 R |
| 5,259,486 | A * | 11/1993 | Deane | B22D 19/02 188/218 A |
| 5,884,980 | A * | 3/1999 | Visser | B60B 27/0068 188/218 XL |
| 6,241,056 | B1 * | 6/2001 | Cullen | B22D 19/00 188/218 R |
| 8,833,530 | B2 * | 9/2014 | Pahle | F16D 65/10 188/218 R |
| 9,416,833 | B2 * | 8/2016 | Bouvier | F16D 65/123 |
| 2006/0012242 | A1 * | 1/2006 | Pete | F16D 65/12 301/124.1 |
| 2010/0065388 | A1 * | 3/2010 | Kleber | B22D 19/04 188/218 XL |
| 2012/0118684 | A1 * | 5/2012 | Pahle | F16D 65/10 188/218 R |
| 2012/0175202 | A1 * | 7/2012 | Pahle | F16D 65/123 188/218 XL |
| 2017/0074337 | A1 * | 3/2017 | Borner | F16D 65/123 |
| 2019/0353207 | A1 * | 11/2019 | Gonska | B60B 27/0052 |
| 2020/0025271 | A1 * | 1/2020 | Sabeti | F16D 65/123 |

FOREIGN PATENT DOCUMENTS

| | | |
|---|---|---|
| DE | 102015212017 | 12/2016 |
| DE | 102015114551 | 3/2017 |
| EP | 1426644 | 8/2006 |
| WO | 2007076156 | 7/2007 |
| WO | 2012101561 | 8/2012 |
| WO | 2014160888 | 10/2014 |

* cited by examiner

Fig. 6

MULTI-PART BRAKE DRUM

BACKGROUND OF THE INVENTION

The invention concerns a brake drum, in particular for utility vehicles.

Brake drums are already known from the state of the art, these serve to be able to come into contact with brake pads in such a way that a braking torque is generated around an axis in order to brake a vehicle. However, the problem with brake drums known from the state of the art is that due to the one-sided fixing during braking by thermally induced tensions they experience a distortion, which is also known as warping. This warping causes that the intended friction area of the brake drum can no longer come into complete contact with the brake pad. This results in a locally highly fluctuating wear of the brake drum, so that brake drums have to be replaced prematurely. In addition, the warping has the further disadvantage that it promotes the tendency to crack formation.

It is therefore the object of the present invention to provide a brake drum which minimizes the effects of the warping.

SUMMARY OF THE INVENTION

According to the invention, a brake drum, in particular for utility vehicles, is mounted or adapted to be mounted rotatably about an axis of rotation, wherein the brake drum comprises a friction section and a connection section, wherein the friction section comprises a friction surface and a plurality of transmission structures, wherein the connection section comprises at least one mounting surface and a plurality of transfer structures, wherein the transfer structures engage positively and/or non-positively in the respective complementary transfer structures, so that a torque about the axis of rotation can be transmitted positively, and wherein the mounting surface serves to fix the brake drum indirectly or directly to a hub. The axis of rotation about which the brake drum is rotatably mounted or about which it can be mounted is in particular the axis of rotation of the shaft, the axle or the hub which is to be braked by means of the brake drum according to the invention. The brake drum is preferably made up of several components which are not connected to each other by a material bond. In particular, the friction sections and the connection sections can be two separate components, which advantageously form two different areas of the brake drum along the axis of rotation. The friction section of the brake drum is the component or area of the brake drum which is used to generate a braking torque by contact with one or more brake pads. For this purpose, the friction section has at least one friction surface which is designed to be able to come into direct contact with the stator-side brake pads in order to generate a braking torque about the axis of rotation. The friction surface can be a one-piece friction surface or divided into sub-surfaces, as can be achieved by providing grooves, for example. The friction surface is expediently designed to be rotationally symmetrical to the rotational axis, especially in certain areas, and advantageously extends at least partially along the rotational axis. The friction surface is particularly preferred to form a part of an envelope surface of a cylinder or cone which is rotationally symmetrical about the axis of rotation. The friction surface can in particular be designed in such a way that it is at least partially conical about the axis of rotation. In this way, the removal of dirt, impurities and/or moisture can be achieved or improved so that braking performance can be increased.

Expediently, the friction surface, especially along the axis of rotation, has a large number of conical areas. It is advantageous for at least one, preferably all, conical areas to form an angle between 1° to 5°, preferably an angle of 2° to 4° and more preferably an angle of 3° with the axis of rotation. Advantageously, an intermediate area is formed between two conical areas in each case, in particular the intermediate area is cylindrical around the axis of rotation so that the transition between the conical areas is as smooth as possible. This can simplify the production of the friction surface in particular. In particular, the transition between individual conical areas and/or between the intermediate areas and the adjacent conical area of the friction surface is designed to be continuous. In other words, the transition can be designed in such a way that it does not show any cracks. This can also greatly simplify the production of the brake drum. It is particularly advantageous if passages, especially holes, are provided on the friction surface and/or in the intermediate areas, which completely penetrate the friction section, especially perpendicular to the axis of rotation. In other words, a passage can be provided in the friction surface and/or in the intermediate areas which connects the interior of the friction section with the surroundings. Through this, dirt, moisture and/or brake dust can be transported into the environment. Alternatively or additionally preferred, such passages can also extend from other surfaces of the friction section, in particular from an inner surface, the friction section. However, in order to improve the removal through the openings, it is preferable if the conical areas adjacent to the openings are designed to run towards the openings. In other words, this may mean that the opening are located in the areas of the conical sections or in the intermediate areas which are further away from the axis of rotation than the adjacent areas. In order to transmit a torque, in particular the braking torque around the axis of rotation, to the connecting section in a positive manner, the friction section has a large number of transmission structures. These transmission structures interlock with complementary transmission structures of the connection section in order to transmit the torque around the axis of rotation safely. These transmission structures and/or the complementary transfer structures can be designed in one piece with the friction section or the connection section, for example by simultaneous formation during the manufacture, in particular during casting, of the transfer structures with the connection section and/or the transmission structures with the friction section. This one-piece design makes it possible to achieve a mechanically particularly stable connection. For example, the transfer structures can be designed as a ring which is continuous in the circumferential direction and has, for example, radially extending lamellae, these lamellae engaging in complementarily designed transfer structures, these transfer structures possibly also being designed as radially extending lamellae. Alternatively or additionally preferred, the transmission structures can also be designed as separate parts, for example as bolts and/or by means of intermediate elements. These intermediate elements can be bolts or screws, for example, which are screwed or cast into the connection section. It is advantageous if these intermediate elements extend parallel to the axis of rotation or in the radial direction. Advantageously, at least parts of the friction section and/or the connection section can be provided with a ceramic coating. This can impede heat conduction, especially between the friction section and the connection section. Preferably the contact surfaces of the transmission structures and/or the transmission structures are provided with a ceramic coating, in particular the areas which contact the intermediate element(s) and/or the friction section and/or the connection section. This is particularly effective in impeding the heat transfer between the friction section and the connection section, so that thermal deformation of the connection section is minimized. Transfer structures and transfer structures are complementary, particularly if they are arranged closest to each other and/or contact each other. The transfer structures and the transmission structures can be interlocked in an exemplary design such as a gearing and/or as complementary rings in such a way that a torque about the axis of rotation can be transmitted positively. It is advisable for the brake drum to have 3 to 20 transfer structures and complementary transmission structures, preferably 5 to 16 and more preferably 6 to 10, in order to achieve reliable torque transmission. Preferably, the transmission structures make direct contact with the transfer structures in order to achieve the most wear-resistant and reliable torque transmission possible. Alternatively, intermediate elements can also be arranged between complementary transmission structures and transfer structures, whereby the intermediate elements can be designed in particular for damping vibrations and/or preventing corrosion. Especially preferred the intermediate elements are at least partially, preferably completely, made of a viscous material, such as a polymer or a rubber. The connecting section, which includes the transfer structures, serves, among other things, to transmit the torque absorbed by the friction section to a hub via the mounting surface. In addition, the connection section can also be designed to support the brake drum and thus transmit not only torques but also forces to the hub. The mounting surface itself can be formed by one continuous surface or by several non-continuous sub-surfaces. The mounting surface, or its sub-surfaces, preferably has a normal which is aligned essentially parallel to the axis of rotation in order to achieve simple mounting and a space-saving brake drum. It is advisable for the mounting surface to have mounting openings by means of which the mounting surface or the connection section can be fixed relative to the hub. The mounting openings are designed to accept mounting and/or clamping elements, such as screws, bolts or rivets, in order to fix and/or clamp the brake drum to the hub. The mounting openings are preferably round at least in some areas, in particular completely, so that they can be manufactured at low cost. In order to achieve a particularly simple and cost-effective production, the mounting openings extend essentially parallel to the axis of rotation and/or perpendicularly from the mounting surface. The hub, to which the mounting surface of the connection section is or can be indirectly or directly fixed, can be formed, for example, by a wheel hub, a wheel bearing housing, an axle and/or a shaft—or parts of these components. The embodiment of the brake drum in accordance with the invention ensures that the individual components of the brake drum, in particular the friction section relative to the connection section, have a certain flexibility so that the effects of thermally induced distortion (warping) can be minimized.

Preferably at least one transmission structure is displaceable relative to the respective complementary transfer structure in a radial direction, in particular in the positive radial direction. The radial direction is that direction which is perpendicular to the axis of rotation, the positive direction being in particular that direction which points away from the axis of rotation. A transmission structure is displaceable relative to the respective complementary transfer structure, in particular if the transfer structure on its own can be displaced relative to the transfer structure without this being positively prevented, in particular by the transfer structure. In an exemplary embodiment, this can be achieved in that the transmission structure is designed as a radially outwardly directed recess in which the transfer structure of the connection section is guided in a positive-engaged manner—along the extension of the transmission structure. In other words, the transfer structure can be designed like a kind of cylinder around the transfer structure (as a piston), so that a relative displacement of the two structures to each other can take place. This type of design of the transmission structure and the transfer structure can counteract the thermally induced expansion of the friction section, in particular in the radial direction, in such a way that the thermally induced deformations have no or only a very small effect on the mechanical load of the transmission structure and the transfer structure. Preference is given to the predominant part of the transfer structures, in particular all of them, being displaceable relative to the respective complementary transfer structure in the radial direction. This allows the thermally induced mechanical load on the brake drum to be reduced in a particularly effective manner.

Expediently, the transfer structures extend from a stop surface, in particular in the direction of the axis of rotation. The stop surface is a surface which is in direct or indirect contact with a corresponding surface of the friction section and is not part of a transfer structure. In other words, the stop surface can be a surface which is not suitable for positive torque transmission. In particular, the stop surface preferably has a normal which is essentially parallel to the axis of rotation. Among other things, this results in a particularly compact brake drum in the direction of the axis of rotation. Essentially parallel means that an angle of +/−15°, preferably +/−10°, more preferably +/−5°, and most preferably +/−2°, may lie between the two decisive directions in order to be considered essentially parallel to each other. By extending the transfer structure from the stop surface, the brake drum requires only a small amount of installation space.

The connection section preferably has bracing openings which are designed to accommodate clamping devices to brace the friction section with the connection section, particularly in the direction of the axis of rotation. Clamping devices can be screws, rivets, bolts or pins, for example. The bracing openings preferably extend from the stop surface and are aligned essentially parallel to the axis of rotation. The friction section may have bracing recesses to accommodate the bracing devices. By bracing the friction section with the connection section, it is possible to ensure a certain centering and/or resistance to displacement between the friction section and the stop section. Particularly preferred, the clamping devices have a clearance, especially radially around the clamping devices, to the bracing openings, so that even in the event of thermally induced expansion of components of the brake drum, especially the friction section, no positive-engaged forces and/or torques can be transmitted directly from the bracing devices to the bracing openings of the connection section. This reduces the loads on the bracing devices, so that they can be dimensioned smaller and thus save weight.

Expediently, the transfer structures each have at least one gearing area, which extends in a radial direction, and wherein the gearing areas are adapted to transmit the torque about the axis of rotation to the complementary transmission structure. This improves the relative displaceability between the transfer structure and the transmission structure so that the effect of warping can be further reduced. The gearing area is in particular that area of the transfer structure which is designed to transmit the torque around the axis of rotation in a positive-locking manner. Advantageously, the gearing areas limit the transfer structure in the radial direction and/or in the direction of the axis of rotation. In other words, this can mean that the gearing areas form the end sections of the transfer structures.

Advantageously, at least one transfer structure, in particular in the gearing area, has a substantially parallelogram cross-section. This design of the transfer structure's cross section allows a particularly low local surface pressure to be achieved. The relevant cross-sectional area lies in particular in a plane whose normal is essentially parallel to the radial direction or the axis of rotation. A cross section is essentially parallelogram in particular if the cross section has two pairs of opposite distally bounding plane surfaces, the opposite surfaces being substantially parallel to each other. It is irrelevant whether the surfaces are limited to the adjacent surfaces by a rounding and/or by a phase. The only decisive factor is that the opposing surfaces are oriented substantially parallel to each other. In this context, two surfaces are substantially parallel to each other in particular if their (direction-independent) normals are essentially parallel to each other in the decisive sectional plane.

Advantageously, at least one transmission structure, preferably all transmission structures, is formed by a recess or by a projection which extends in the direction of the radial direction. This design of the transmission structure ensures that it can be manufactured at low cost.

Alternatively or additionally preferred, at least one transfer structure, preferably all transfer structures, and/or one transfer structure has an essentially circular or v-shaped cross-section. This geometric design allows a centering effect to be achieved so that a particularly secure guidance of the friction section is achieved. The relevant cross-sectional area lies in particular in a plane whose normal is substantially parallel to the radial direction or the axis of rotation. A substantially circular cross-section is present in particular if the cross-section is circular except for the connection to the rest of the friction section. A v-shaped cross-section, on the other hand, is present in particular if the cross-section is designed in such a way that it tapers in a v-shape towards the part which connects the transfer structure with the rest of the friction section.

In a preferred embodiment, at least one transmission structure extends from an inner surface, the inner surface limiting the friction section at least in regions towards the axis of rotation. The inner surface is thereby preferably a separate surface from the friction surface, which is delimited from the friction surface in particular by a groove, a projection or recess. Here the inner surface can enclose or limit the transmission structure at least partially, preferably completely. By extending the transmission structures from the inner surface, it can be achieved that the brake drum has a particularly compact design in the direction of the axis of rotation.

Preferably, the transmission structures and/or the transfer structures are arranged in pairs in a circumferential direction. The circumferential direction is the polar coordinate around the axis of rotation. In other words, the axis of rotation, the radial direction and the circumferential direction can thus form a cylindrical coordinate system, with the axial direction forming the height coordinate, the radial direction forming the radial coordinate and the circumferential direction forming the polar coordinate. Transfer structures and/or transmission structures are formed in pairs if an adjacent transmission structure or transfer structure is located closer in the circumferential direction than the other adjacent transmission structure or transfer structure. Alternatively or additionally, a pairwise arrangement can also be characterized in that the angle around the axis of rotation or in the circumferential direction surrounding a pair is smaller than the angle surrounding the space between two adjacent pair. Due to the small distance between the pairwise arranged transmission structures or transfer structures, the resulting loads due to thermally induced stresses are small on the transmission or transfer structures. It is particularly preferable if the transmission structures have play in the circumferential direction (positive and/or negative) away from the pair. This makes it possible for the pair to spread in the circumferential direction without any tension taking place. In addition or alternatively preferred at least one of the bracing openings and/or at least one of the bracing recesses should be arranged in a pairwise arrangement of the transfer structures and/or the transfer structures in such a way that it is arranged in the circumferential direction between the pair-forming transmission structures and/or transfer structures. By this arrangement of the bracing opening and/or the bracing recess it can be achieved that, in the case of a warping of the brake drum, the resulting loads on the bracing devices are particularly low. It is advisable for the majority of the bracing openings and/or bracing recesses, preferably all of them, to be arranged between pair-forming transmission structures and/or transfer structures.

It is advantageous for the friction section, in particular at least in the area closest to the connection section, to have an outer surface which outwardly delimits the friction section in the radial direction, wherein preferably at least one transmission structure extends from the outer surface. The outer surface is therefore a surface of the friction section which delimits it outwardly at least in a sectional plane whose normal is parallel to the axis of rotation. By extending from the outer surface, a particularly compact brake drum can be achieved. In an exemplary embodiment, the transmission structure is designed as a recess, the transmission structure extending from the outer surface in such a way that it penetrates the friction section as completely as possible. In an alternative embodiment, the transmission structure is formed as a gearing, which advantageously extends in the direction of the axis of rotation, the transmission structure thereby extending the outer surface in the direction of the axis of rotation. The advantage of this embodiment is that it can be created easily and cost-effectively during the original forming process.

In a preferred design, the connection section, in particular at least in the area closest to the friction section, has a boundary surface which outwardly delimits the connection section in the radial direction, the boundary surface and the outer surface forming a common surface. In the area closest to the friction section, a surface is, inter alia, if it has a maximum distance from the friction section of 20 mm at the most. The boundary surface limits the connection section outwards, thus forming a surface at least in some areas which limits the connection section outwards in the radial direction. Preferably, for this purpose, the boundary surface has a normal which is essentially parallel to the radial direction. By forming the boundary surface as a common surface with the outer surface, the aerodynamic resistance of the brake drum can be reduced—by reducing the turbulence—and the risk of injury during brake drum maintenance can also be reduced. Areas are common in particular when the surfaces in question extend between two ideal cones which are clamped around the same axis of rotational symmetry, which is in particular the axis of rotation, and wherein the outside surfaces of the two cones may in each case have a constant distance from one another of at most 15 mm, preferably 10 mm and more preferably 5 mm. The two cones arranged concentrically to one another can alternatively be designed as cylinders, so that the boundary surfaces and the outer surfaces preferably have the same constant diameter relative to the axis of rotation.

Preferably, the transfer structures engage positively in the respective complementary transfer structures in such a way that a displacement between the friction section and the connection section in the direction of the axis of rotation and/or in the circumferential direction is prevented. By this design of the transfer structures or the transmission structures, a secure relative positioning of the connection section to the friction section in the direction of the axis of rotation and/or in the circumferential direction to each other can be ensured. For example, this can be done by casting the friction section into the connection section or the connection section into or onto the friction section. In other words, the friction section and the connection section can be already connected to each other during the forming process.

Expediently, the transfer structures extend in the radial direction, wherein the transmission structures extend radially in the direction of the axis of rotation. In other words, the transfer structures can form a type of gearing with the transmission structures, whereby the two intermeshing gearing partners are not aligned or arranged parallel to each other. This results in a particularly compact brake drum, especially in the direction of the axis of rotation and/or in the radial direction.

Expediently, the connecting section comprises a plurality of secondary transfer structures, which extend in particular in the radial direction, wherein the friction section comprises a plurality of secondary transmission structures, wherein the secondary transmission structures each engage in a complementary secondary transmission structure, so that a torque about the axis of rotation and/or a force in the direction of the positive and/or the negative axis of rotation can be transmitted in a positive manner between the secondary transfer structures and the secondary transmission structures. The secondary transmission pair, which is formed by the complementary secondary transmission structures and secondary transfer structures, can therefore be used for a particularly secure support or bearing of the friction section relative to the connection section. Preferably, the secondary transfer pair(s) is (are) designed in such a way that it (they) cannot be detached non-destructively, in particular this can be achieved by encapsulating the secondary transmission structures in the secondary transfer structures or vice versa. Particularly preferred, the secondary transfer structures transfer the forces between the friction section and the connection section completely by engaging the complementary secondary transmission structures at least in one, expediently the one pointing away from the friction section, preferably in both directions along the axis of rotation (+/−). In other words, this means that the secondary transfer structures, in interaction with the complementary secondary transmission structures, can be completely responsible for preventing the relative displaceability of the friction section to the connection section in the direction of the axis of rotation. In this way, the transfer structures or transmission structures can be optimally adapted to the transmission of torques, since they do not have to transmit forces in the direction of the axis of rotation from the friction section to the connection section—with this type of embodiment. In particular, the use of secondary transfer structures and secondary transmission structures can eliminate the need for bracing openings and the associated weakening. Preferably, the secondary transfer structures are located at the same height in the direction of the axis of rotation as the transfer structures. In this way it can be achieved that the thermally induced deformation minimizes or prevents the secondary transfer structures or the secondary transmission structures from being distorted by the transfer structures or transmission structures due to their geometric arrangement. It is expedient for the brake drum to have at least four, preferably at least six and more preferably at least eight, of these secondary transmission pairs.

In a preferred embodiment, at least one transmission structure, preferably all of them, each comprises and/or surrounds, preferably completely, at least one secondary transmission structure. This arrangement of the secondary transmission structure relative to the transmission structure results in a particularly compact friction section of the brake drum. For example, this can be achieved by the transmission structure being designed as a gearing or as a projection in the direction of the axis of rotation and the secondary transmission structure being designed as a recess which extends substantially parallel to the radial direction. By this type of design of the friction section, the transmission structures and the secondary transmission structures can be thermally decoupled from one another in such a way that a thermally induced expansion of the friction section, in particular in the direction of the axis of rotation, causes only slight mechanical stress in the area of the transmission structures and/or the secondary transmission structures.

Preferably, the ratio between the extension of the connection section in the direction of the axis of rotation to the extension of the friction section in the direction of the axis of rotation is in a range from 0.05 to 0.4, preferably in a range from 0.1 to 0.3 and more preferably in a range from 0.15 to 0.25. The extension of the connection section in the direction of the axis of rotation is in particular the maximum extension of the connection section in the direction of the axis of rotation, preferably the transfer structures not being taken into account when determining the extension. The decisive extension of the friction section in the direction of the rotation axis is also formed by the maximum extension of the friction section in the direction of the axis of rotation. With a ratio of the extension of the connection section in the direction of the axis of rotation to the extension of the friction section in the direction of the axis of rotation of 0.05 to 0.4, a connection section that can be subjected to a particularly high mechanical load and thus a particularly reliable torque transmission between friction section and connection section around the axis of rotation can be achieved. At a ratio of 0.1 to 0.3, the applicant has found that, because of the relative modal masses of the friction section and the connection section, a particularly low tendency to oscillate, especially in the audible range, of the brake drum can be achieved. In order to achieve a compact design of the brake drum, the extension ratio in the direction of the axis of rotation is preferably in the range from 0.15 to 0.25.

The ratio between the inner diameter of the connection section and the inner diameter of the friction surface is expediently in a range of 0.5 to 1.1, preferably in a range of 0.6 to 0.95 and more preferably in a range of 0.75 to 0.9. The decisive inner diameter of the connection section is the minimum possible inner diameter of the connection section around the axis of rotation. The decisive inner diameter of the friction surface is the average diameter or the smallest possible diameter of the friction surface relative to or around the axis of rotation. With a ratio of the inner diameter in a range of 0.5 to 1.1, a connection section with particularly high mechanical load capacity can be achieved. With a ratio of the inner diameters in the range of 0.6 to 0.95, the applicant has found that there is a particularly low tendency for the connection section to crack. A ratio in the range of 0.7 to 0.9 results in a particularly compact brake drum, so that required space can be saved.

Preferably the friction section has at least one contact surface, wherein the normal of the contact surface has a component in the direction of the radial direction, wherein the connection section has an interfacing surface, wherein the normal of the interfacing surface is substantially parallel to the normal of the contact surface, wherein the contact surface and the interfacing surface make contact in a first operating state, in particular directly, and wherein the contact surface and the interfacing surface are spaced apart from each other in a second operating state, in particular in the direction of the radial direction, wherein the temperature of the brake drum is lower in the first operating state than in the second operating state. The contact surface and the interfacing surface can be formed by any surfaces of the friction section or the connection section, wherein in the first operating state these are designed to contact or to be able to contact each other. The normals of the two surfaces have at least one component in the direction of the radial direction and are oriented substantially parallel to each other, whereby in this context "substantially parallel to each other" means that the outwardly facing normal of the contact surface is oriented substantially parallel to the inwardly facing normal of the interfacing surface (direction independence of the normals +/−). The first operating state is characterised by the fact that the brake drum is in a cooled condition. In particular, the brake drum has ambient temperature in the first operating state. The temperature of the brake drum is determined by the averaged, in particular mass-averaged, temperature of the friction section and the connection section. The second operating state is characterised in particular by the fact that the temperature of the brake drum is increased compared to the first operating state by braking. In particular, the temperature of the first operating state can preferably be at least 20 Kelvin, more preferably at least 100 Kelvin and most preferably at least 150 Kelvin higher than the temperature in the first operating state. This type of brake drum design can be used to reduce the effect of the warping on the mechanical load on the brake drum components.

It is advantageous that the connection section is predominantly made of a different material than the friction section. This means that the connection section and/or the friction section can be made of materials which can be optimally adapted to the tasks to be performed. For example, the connection section can be made of a grey cast iron such as EN-GJS-500-7 or of an aluminium alloy, whereby the friction section can be made of a ferrous metal such as EN-GJL-250 or generally of a grey cast iron. When EN-GJS-500-7 is used in the connection section, a connection section with particularly high mechanical load capacity can be achieved. The use of EN-GJL-250 to form the friction section has the advantage that this choice of material allows a particularly high level of material damping to be achieved, resulting in a particularly "quiet" brake drum. This choice of material optimises the connection section to have a particularly low weight and the friction section to have a particularly low tendency to wear. Alternatively preferred, the connection section and the friction section can also be made of the same material to save costs.

BRIEF DESCRIPTION OF THE DRAWINGS

Further advantages and features of the present invention result from the following description with reference to the figures. Individual features of the embodiment shown can also be used in other embodiments, unless this has been expressly excluded.

In the drawings.

DETAILED DESCRIPTION OF THE PREFERRED EMBODIMENTS

Figure 1:
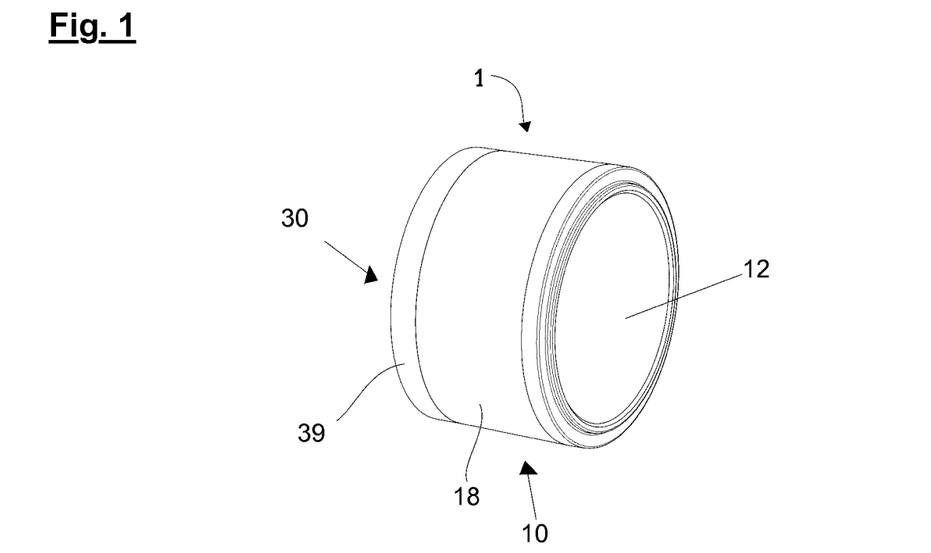
FIG. 1 shows a schematic perspective view of a brake drum according to the invention.

FIG. 1 shows a brake drum 1 according to the invention, which has a friction section 10 and a connection section 30. The connecting section 30 is radially outwardly bounded by the boundary surface 39 and the friction section 10 by the outer surface 18. Towards the axis of rotation A (not marked in FIG. 1), the friction section 10 is bounded at least partially by the friction surface 12.

Figure 2:
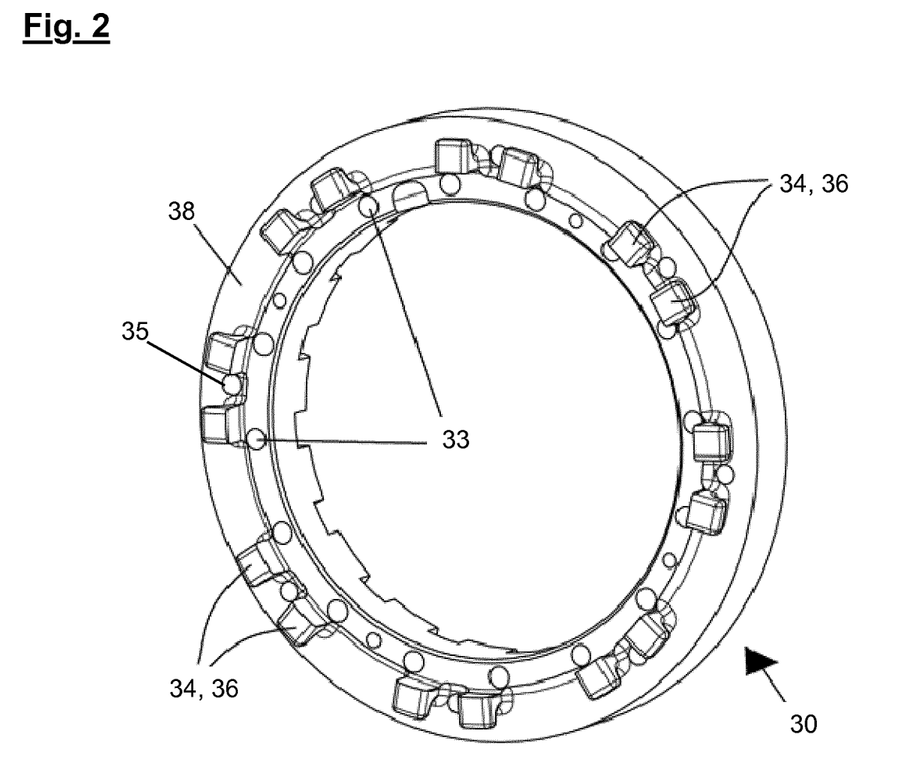
FIG. 2 shows a perspective view of a connection section according to the invention.
Figure 3:
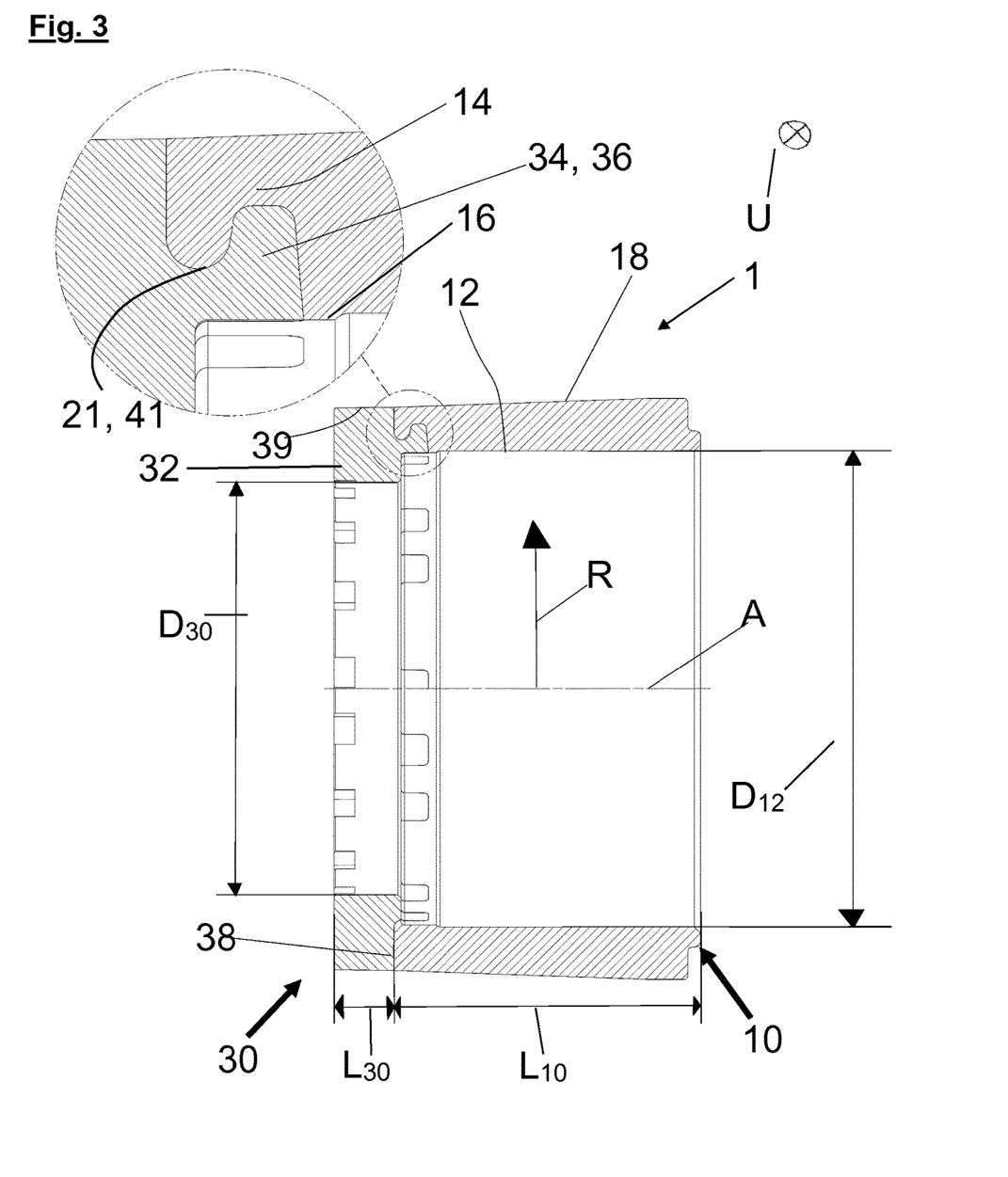
FIG. 3A shows a cross-section side elevation view through the brake drum according to the invention.
FIG. 3B shows an enlarged partially cross-section side elevation view of the brake drum according to the invention.

FIG. 2 shows a connection section 30 according to the invention, which can be used for example in FIG. 1 and/or in FIG. 3 depicted embodiment of the brake drum 1. In the embodiment shown, connection section 30 has a stop surface 38, against which a friction section 10 not shown can be brought into contact, in particular by direct contact. Bracing holes 35 and transfer structures 34 extend from the stop face 38 in the direction of the axis of rotation A (not marked in FIG. 2). The bracing holes 35 are designed to accommodate bracing devices not shown. The transfer structures 34 are arranged in pairs in the circumferential direction U as shown in the embodiment, with a bracing opening 35 arranged between the two pair-forming transfer structures 34. At the end opposite to the stop face 38, the transfer structures 34 each have a gearing area 36 which is designed to transmit the torque about the axis of rotation A, in particular for the most part, to the transmission structures 14 of the friction section 10.

FIGS. 3A and 3B show a sectional view through an embodiment of a brake drum 1 according to the invention, whereby the design of the transmission structures 14 and the transfer structures 34 are once more shown clarifyingly in the detailed view above. The connection section 30 extends in the direction of the axis of rotation A over the length $L_{30}$ and the friction section 10 over the length $L_{10}$. The connection section 30 has a stop surface 38 which makes direct contact with a corresponding surface of the friction section 10. The connection section 30 has an internal diameter $D_{30}$, through which an axis or shaft not shown can extend. The mounting surface 32 delimits the connection section 30 in the direction of the axis of rotation A opposite friction section 10. The connection section 30 has a boundary surface 39, which delimits the connection section 30 outwards in the radial direction R and the friction section 10 has an outer surface 18, which also delimits the same in the radial direction R, the boundary surface 39 and the outer surface 18 being formed as a common surface. In the inward radial direction R, the friction section 10 is predominantly bounded by the friction surface 12, which has an inner diameter $D_{12}$. In addition, the friction section 10 is also bounded radially inwards by the inner surface 16, from which the transmission structure 14 extends in the direction of the radial direction R in the form of a recess. The transfer structure 14 engages in the complementary transfer structure 34, which extends in the direction of the axis of rotation A from the stop surface 38 and has a gearing section 36, which extends in the radial direction R. Not shown in the sectional drawing shown here—the friction section 10 and the connection section 30 each have a plurality of transmission structures 14 and transfer structures 34 in the circumferential direction U.

Figure 4:
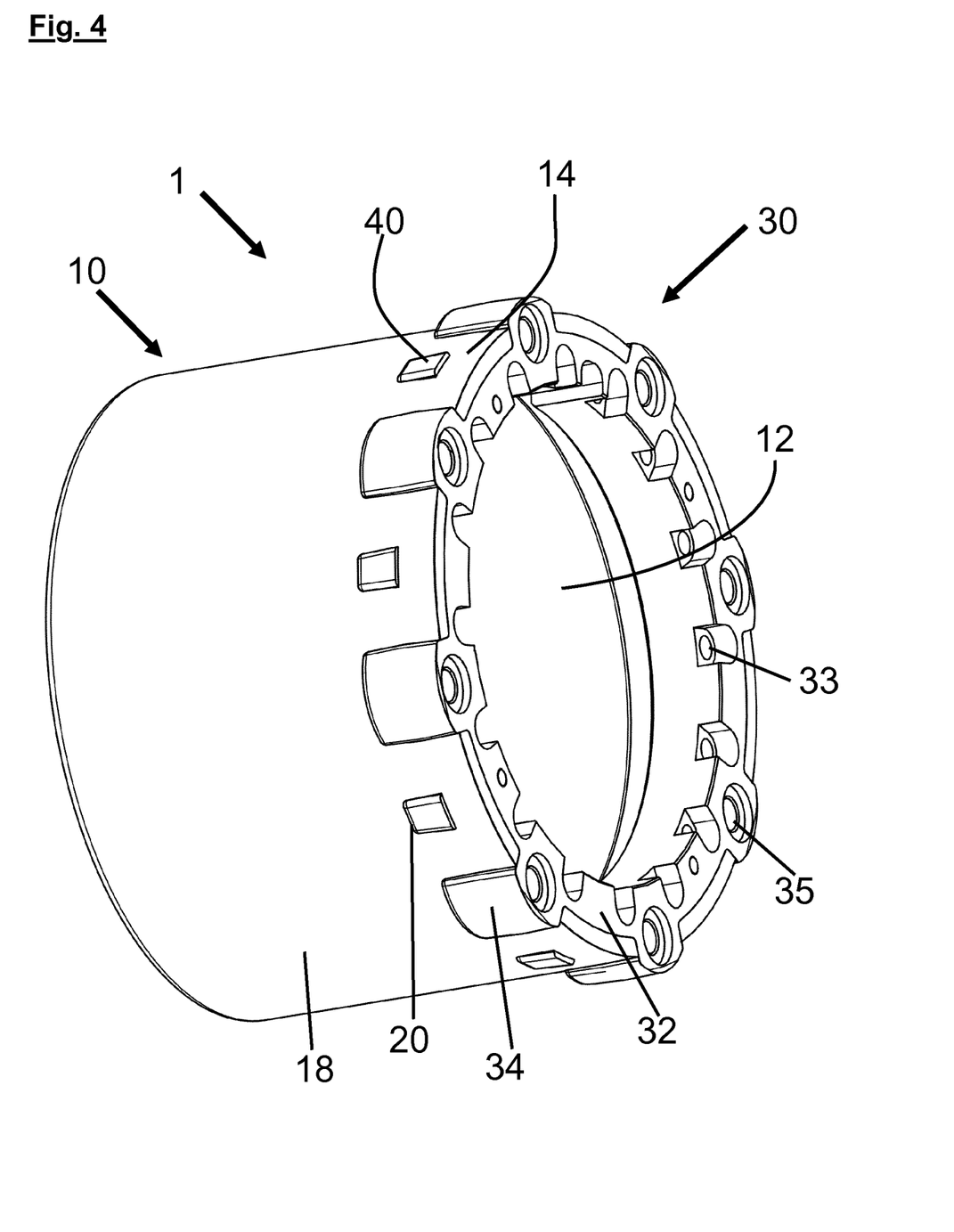
FIG. 4 shows another perspective view of the brake drum according to the invention.

FIG. 4 shows a further embodiment of a brake drum 1 according to the invention, whereby the friction section 10, in addition to the transmission structures 14, which are designed as a gearing in the direction of the axis of rotation A, also has secondary transmission structures 20, which are designed as an essentially parallelogram recess. The connecting section 30 has respective complementary transfer structures 34, which are designed as gearings pointing radially outwards. The transfer structures 34—in the embodiment shown—each have a bracing opening 35. The secondary transfer structures 40 are designed as projections in the radial direction R, whereby these have an essentially parallelogram cross-section and engage in the secondary transmission structures 20. For fixing to a hub not shown, the connecting section 30 has a mounting surface 32 and mounting openings 33.

Figure 5:
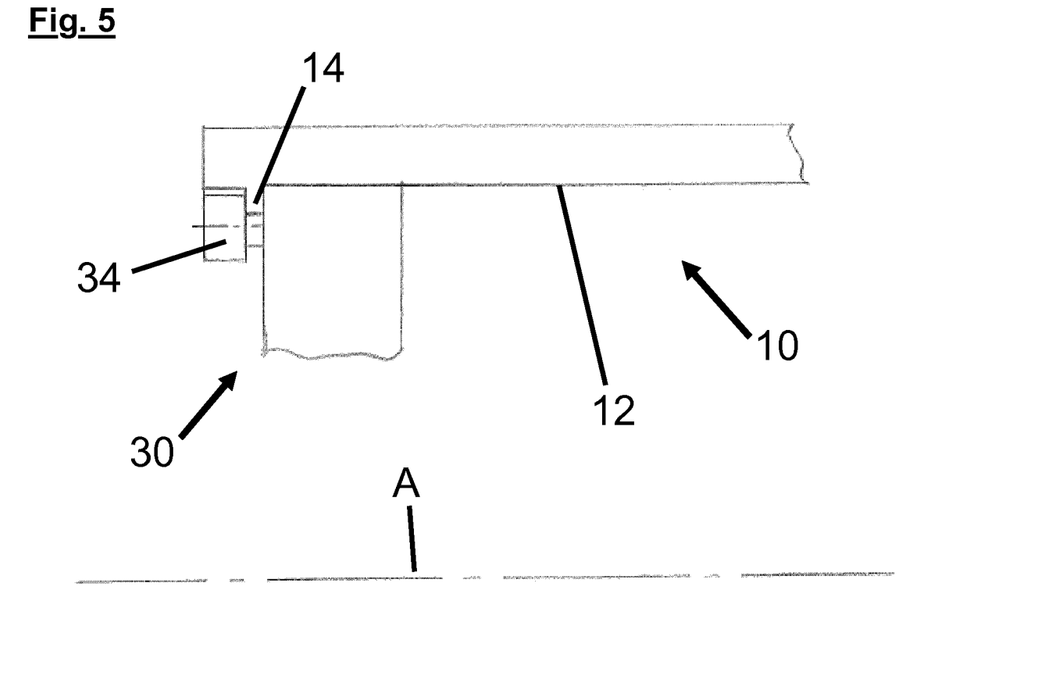
FIG. 5 shows a partial section side elevation view of the brake drum according to the invention.

FIG. 5 shows a section of a brake drum 1 according to the invention. In the embodiment shown, a transmission structure 14 is integrally formed on the friction section 10, in which a complementary transfer structure 34 engages. This transfer structure 34 is designed as a fit bolt which connects the friction section 10 with the connection section 30 in a positive and non-positive manner. In the embodiment shown, the friction surface 12 of the friction section 10 can be moved completely past the connection section 30 in the direction of the axis of rotation A. In particular, this makes it possible to replace friction section 10 at a later date without having to disassemble the connection section 30.

Figure 6:
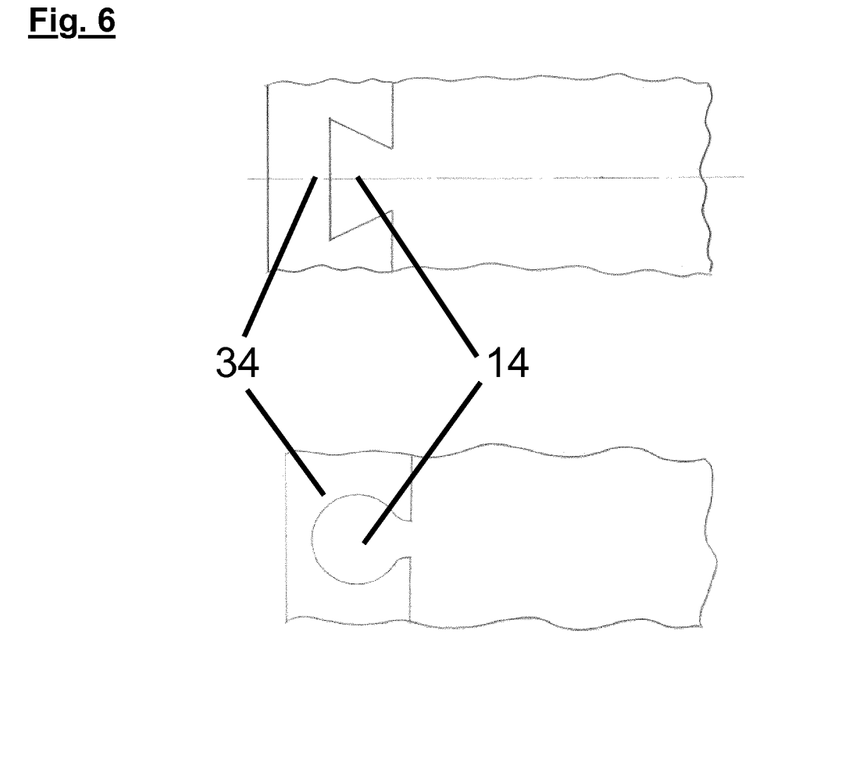
FIGS. 6A and 6B show various embodiments of transmission and transfer structures.

FIGS. 6A and 6B show embodiments of various transmission structures 14 and complementarily designed transfer structures 34, the one embodiment of the transmission structure 14 or the complementarily designed transfer structure 34 having a substantially circular cross-section and the other embodiment of the transmission structure 14 or the complementarily designed transfer structure 34 having a v-shaped cross-section.

LIST OF REFERENCE SIGNS

1—brake drum
10—friction section
12—friction surface
14—transmission structure
16—inner surface
18—outer surface
20—secondary transmission structure
21—contact surface
30—connection section
32—mounting surface
33—mounting opening
34—transfer structure
35—bracing opening
36—gearing area
38—stop surface
39—boundary surface
40—secondary transfer structure
41—interfacing surface
A—axis of rotation
$D_{12}$—inner diameter of the friction surface
$D_{30}$—Inner diameter of the connection section
$L_{10}$—extension of the friction section in the direction of the axis of rotation
$L_{30}$—extension of the connection section in the direction of the axis of rotation
R—radial direction
U—circumferential direction

The invention claimed is:

1. A brake drum for utility vehicles, configured to mount rotatably about an axis of rotation, comprising:
a friction section; and
a connection section;
wherein the friction section includes a friction surface and a plurality of transmission structures;
wherein the connection section includes at least one mounting surface and a plurality of transfer structures;
wherein the plurality transfer structures engage positively and/or nonpositively in the respective complementary transmission structures of the plurality of transmission structures so that a torque about the axis of rotation can be transmitted positively;
wherein the mounting surface fixes the brake drum indirectly or directly to a hub;
wherein the plurality of transfer structures extend from a stop surface, in the direction of the axis of rotation; and
wherein the plurality of transfer structures are arranged in pairs in a circumferential direction including a first pair of transfer structures and a second pair of transfer structures, and wherein a first angle between the transfer structures of the first pair of transfer structures in the circumferential direction and a second angle between the transfer structures of the second pair of transfer structures in the circumferential direction are each less than a third angle between the first pair of transfer structures and the second pair of transfer structures in the circumferential direction.

2. The brake drum according to claim 1, wherein at least one transmission structure of the plurality of transmission structures is displaceable relative to a respective complementary transfer structure of the plurality of transfer structures in a radial direction.

3. The brake drum according to claim 2, wherein the radial direction extends outwardly from the axis of rotation.

4. The brake drum according to claim 2, wherein the plurality of transfer structures each have at least one gearing area which extends in a radial direction, and wherein the gearing areas are configured to transmit the torque about the axis of rotation to the complementary transmission structure.

5. The brake drum according to claim 1, wherein at least one of transfer structures of the plurality of transfer structures in a gearing area has a parallelogram cross-section.

6. The brake drum according to claim 1, wherein at least one transmission structure of the plurality of transmission structures includes a recess or a projection which extends in a radial direction.

7. The brake drum according to claim 6, wherein all of the transmission structures of the plurality of transmission structures includes the recess or the projection.

8. The brake drum according to claim 6, wherein the at least one transmission structure extends from an inner surface, where the inner surface limits the friction section at least in regions towards the axis of rotation.

9. The brake drum according to claim 1, wherein the friction section at least in the area closest to the connection section, has an outer surface which outwardly delimits the friction section in the radial direction, and wherein at least one transmission structure of the plurality of transmission structures extends from the outer surface.

10. The brake drum according to claim 1, wherein the transfer structures engage positively in the respective complementary transmission structures in such a way that a displacement between the friction section and the connection section in the direction of the axis of rotation and/or in the circumferential direction is prevented.

11. The brake drum according to claim 1, wherein the plurality of transfer structures extend in the radial direction, and wherein the plurality of transmission structures extend in the direction of the axis of rotation.

12. The brake drum according to claim 1, wherein the connection section comprises a plurality of secondary transfer structures which extend in the radial direction, wherein the friction section comprises a plurality of secondary transmission structures, that each engage a complementary secondary transfer structure so that a torque about the axis of rotation and/or a force in the direction of the positive and/or the negative axis of rotation can be transmitted in a positive manner between the secondary transfer structures and the secondary transmission structures.

13. The brake drum, according to claim 12, wherein at least one transmission structure of the plurality of transmission structures is interspaced with at least one secondary transmission structure of the plurality of secondary transmission structures about the brake drum.

14. The brake drum according to claim 13, wherein all of the transmission structures of the plurality of transmission structures are interspaced with the at least one secondary transmission structure about the brake drum.

15. The brake drum of claim 13, wherein the at least one transmission structure completely surrounds the at least one secondary transmission structure.

16. The brake drum according to claim 1, wherein the plurality of transmission structures are arranged in pairs in the circumferential direction.

17. A brake drum for utility vehicles, configured to mount rotatably about an axis of rotation, comprising:
    a friction section; and
    a connection section;
    wherein the friction section includes a friction surface and a plurality of transmission structures;
    wherein the connection section includes at least one mounting surface and a plurality of transfer structures;
    wherein the plurality transfer structures engage positively and/or nonpositively in the respective complementary transmission structures of the plurality of transmission structures so that a torque about the axis of rotation can be transmitted positively;
    wherein the mounting surface fixes the brake drum indirectly or directly to a hub;
    wherein the plurality of transfer structures extend from a stop surface, in the direction of the axis of rotation;
    wherein the plurality of transmission structures and/or the plurality of transfer structures are arranged in pairs in a circumferential direction; and
    wherein a ratio between an inner diameter of the connection section and an inner diameter of the friction surface is in a range from 0.5 to 1.1.

18. The brake drum of claim 17, wherein the range is from 0.6 to 0.95.

19. The brake drum of claim 18, wherein the range is from 0.75 to 0.9.

20. A brake drum for utility vehicles, configured to mount rotatably about an axis of rotation, comprising:
    a friction section; and
    a connection section;
    wherein the friction section includes a friction surface and a plurality of transmission structures;
    wherein the connection section includes at least one mounting surface and a plurality of transfer structures;
    wherein the plurality transfer structures engage positively and/or nonpositively in the respective complementary transmission structures of the plurality of transmission structures so that a torque about the axis of rotation can be transmitted positively;
    wherein the mounting surface fixes the brake drum indirectly or directly to a hub;
    wherein the plurality of transfer structures extend from a stop surface, in the direction of the axis of rotation;
    wherein the plurality of transmission structures and/or the plurality of transfer structures are arranged in pairs in a circumferential direction; and
    wherein the friction section has at least one contact surface where a normal of the contact surface has a component vector in a direction of the radial direction, wherein the connection section has an interfacing surface having a normal that is substantially parallel to the normal of the contact surface, wherein the contact surface and the interfacing surface make direct contact in a first operating state wherein the contact surface and the interfacing surface are spaced apart from each other in a second operating state in a direction of the radial direction, and wherein a temperature of the brake drum is lower in the first operating state than in the second operating state.

* * * * *

UNITED STATES PATENT AND TRADEMARK OFFICE
CERTIFICATE OF CORRECTION

PATENT NO. : 11,473,635 B2
APPLICATION NO. : 16/981159
DATED : October 18, 2022
INVENTOR(S) : Kreiner It is certified that error appears in the above-identified patent and that said Letters Patent is hereby corrected as shown below:

In the Specification

Column 2, Line 33:
"opening" should be – openings –

Column 3, Line 8:
"transfer" should be – transmission –

Column 5, Line 33, 40:
"v-shaped" should be – V-shaped –

Column 5, Line 43:
"v-shape" should be – V-shape –

Column 6, Line 7:
"pair" should be – pairs –

Column 6, Line 18 (2nd occurrence):
"transfer" should be – transmission –

Column 7, Line 31:
"connecting" should be – connection –

Column 9, Line 30:
"independence" should be – independent –

Column 9, Line 31:
"characterised" should be – characterized –

Signed and Sealed this
Fourteenth Day of March, 2023

Katherine Kelly Vidal
*Director of the United States Patent and Trademark Office*

CERTIFICATE OF CORRECTION (continued)
U.S. Pat. No. 11,473,635 B2

Column 9, Line 37:
"characterised" should be – characterized –

Column 9, Line 61:
"optimises" should be – optimizes –

Column 10, Line 25:
"connecting" should be – connection –

Column 11, Lines 19-20, 28:
"connecting" should be – connection –

Column 11, Line 49:
"v-shaped" should be – V-shaped –

In the Claims

Column 12, Claim 1, Line 22:
After "plurality" insert -- of --

Column 12, Claim 5, Line 55 (1st occurrence):
After "of" insert -- the --

Column 12, Claim 8, Line 66:
"where" should be – wherein –

Column 13, Claim 17, Line 50:
After "plurality" insert -- of --

Column 14, Claim 20, Line 26:
After "plurality" insert -- of --